United States Patent [19]

Valentin et al.

[11] Patent Number: 4,831,890
[45] Date of Patent: May 23, 1989

[54] DIFFERENTIAL DEVICE

[75] Inventors: Daniel Valentin, Rueil-Malmaison; Jacques Mercier, Paris, both of France

[73] Assignee: Regie Nationale des Usines Renault, Boulogne Billancourt, France

[21] Appl. No.: 146,478

[22] Filed: Jan. 21, 1988

[30] Foreign Application Priority Data

Jan. 23, 1987 [FR] France .................. 87 00757

[51] Int. Cl.$^4$ .................. F16H 1/42; F16H 1/38
[52] U.S. Cl. .................. 74/714; 74/715
[58] Field of Search .................. 74/714, 715

[56] References Cited

U.S. PATENT DOCUMENTS

| 1,276,432 | 8/1918 | Sprenger | 74/714 |
| 2,693,720 | 11/1954 | Wildhaber | 74/714 |
| 3,095,761 | 7/1963 | Hilado | 74/715 |
| 3,706,239 | 12/1972 | Myers | 74/714 X |
| 3,792,628 | 2/1974 | Stieg | 74/714 |
| 3,899,939 | 8/1975 | Hilado | 74/715 |

FOREIGN PATENT DOCUMENTS 2609137 7/1988 France .
2609135 7/1988 France .

*Primary Examiner*—Dirk Wright
*Attorney, Agent, or Firm*—Oblon, Fisher, Spivak, McClelland & Maier

[57] ABSTRACT

Differential device comprising a housing (1) which carries differential pinions (2) with axis parallel to the axis of the housing (1) and two movement outputs which are each accomplished by a differential side gear (5) and (6).

One of the movement outputs is accomplished by means of standard pinions: differential pinion (3) and differential side gear (5), while the other movement output is achieved by means of special pinions rotating in the same direction: differential pinion (4) and differential side gear (6). The differential pinions (3) and (4) are mounted on the same shaft (7) and are solid with one another.

6 Claims, 1 Drawing Sheet

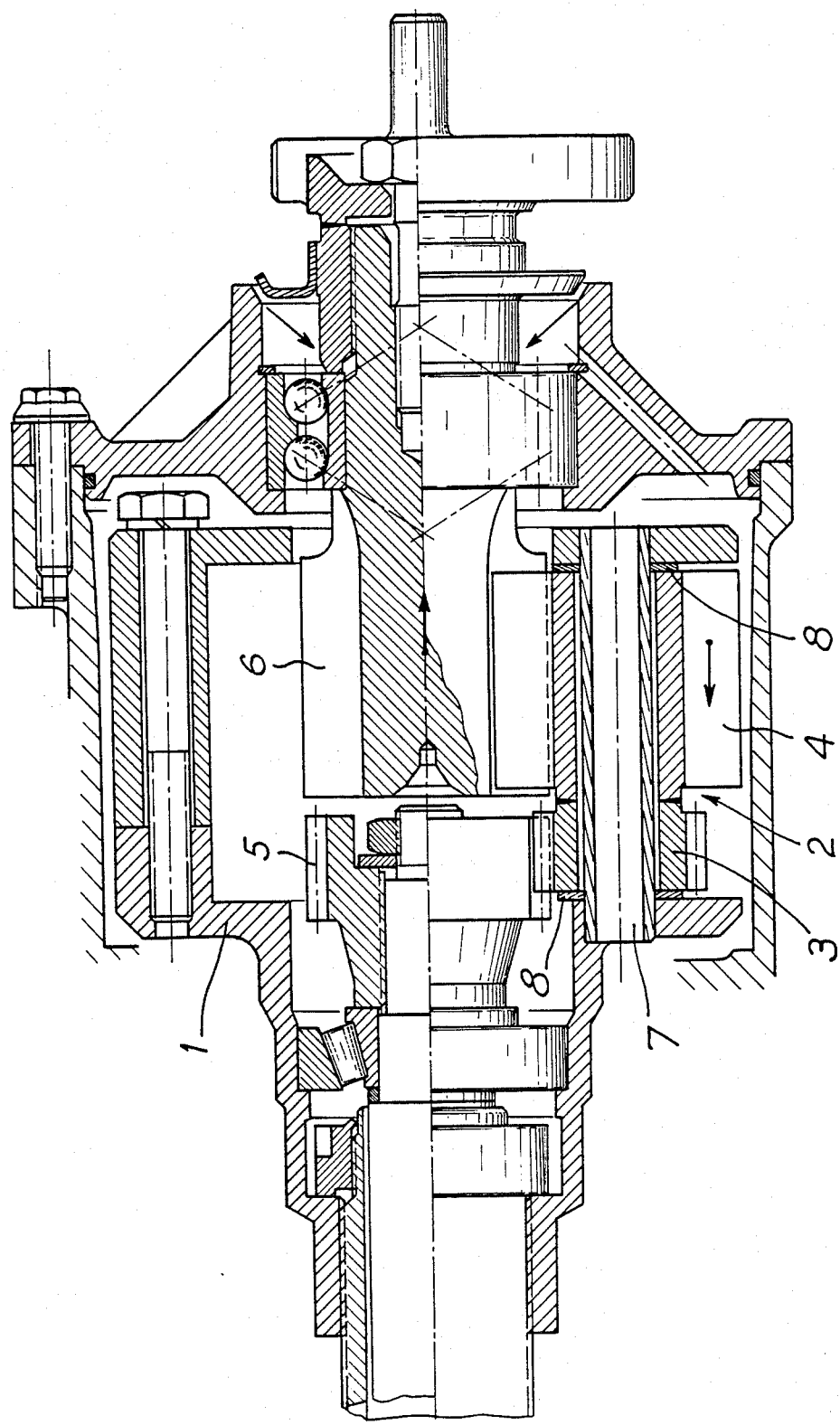

DIFFERENTIAL DEVICE

BACKGROUND OF THE INVENTION

1. Field of the Invention

The invention relates to a differential with a mechanical torque transfer between the two outputs when the torque which one of them can transmit is limited.

These differentials are also called limited slip differentials.

2. Background of the Related Art

Systems with added friction are already known, for example differentials including friction disks, precalibrated or not, between the two outputs or between an output and the housing.

Differentials having a natural friction by the use in their inner kinematic chain of gearings with perpendicular and nonintersecting axes such as a wheel and worm screw are also known.

These embodiments can be criticized for their bulk, their complexity and their cost.

SUMMARY OF THE INVENTION

The object of this invention is the creation of a simple, compact differential that does not use any element in addition to those absolutely necessary to obtain the differential function, therefore having a small cost.

According to the invention, this new type of differential is composed essentially of a standard differential side gear and differential pinions for one output, of differential side gear and differential pinions of the outside gearing type whose elements rotate in the direction described in French patent applicatio No. 8700558 for the other output, that will be called special pinions below.

For this purpose, the differential device according to the invention comprises a housing carrying differential pinions with axes parallel to the axis of the housing and two movement outputs, one of the movement outputs being accomplished by means of standard pinions, i.e., differential pinions and a differential side gear, while the other movement output is achieved by means of helical special pinions rotating in the same direction, i.e., differential pinions and a differential side gear, the differential pinions which are mounted on the same shaft being solid with one another, for example by welding.

According to an embodiment of the invention, stops are placed on the shafts of differential pinion assemblies between the housing and said differential pinions, which makes it possible to obtain additional friction due to the helix angle of special pinions.

The differential, according to the invention, thus exhibits the advantage of being easily mounted in the place of a standard differential while making it possible to obtain the torque transfer function. In addition, this type of differential uses a minimum of elements, i.e., those which are absolutely necessary for the differential function. Because of this, the device, according to the invention, has a particularly advantageous cost.

BRIEF DESCRIPTION OF THE DRAWINGS

Other characteristics and advantages of this invention will come out from the description of the following embodiment given by way of example with reference to the accompanying drawings in which:

FIG. 1 is a longitudinal section of the entire device according to the invention.

DETAILED DESCRIPTION OF THE PREFERRED EMBODIMENT

In FIG. 1, housing 1 receives the input torque. This housing 1 carries differential pinion assemblies referenced 2 with axes 7 parallel to the axis of housing 1, parallel i.e., to the axis of the differential, each comprising a standard-type pinion or differential pinion 3 and a special pinion or differential pinion 4, of the type disclosed in French patent application No. 8700558; these two differential pinions 3 and 4 being connected together in rotation by means of welding. Differential pinions 3 mesh with output differential side gear 5 which is a standard-type pinion.

Differential pinions 4 mesh with output differential side gear 6 which is also a special-type pinion.

In relation to housing 1 of the differential, since differential side gear 6 rotates in one direction, differential pinion assemblies 2 rotate in the same direction (due to the meshing of the special pinions, i.e., differential pinions 4), and differential side gear 5 rotates in the reverse direction (by the meshing of the standard pinions, i.e., differential pinions 3).

The differential function is indeed thus achieved with the minimum of parts.

It should be noted that differential pinions 4, i.e. the special pinions, and their differential side gear 6 can have the same number of teeth and an identical toothing, for example pinions with two teeth. The division of the theoretical torque (in the absence of friction) between the two outputs can be selected at will by selecting the number of teeth of differential pinions 3 and differential side gear 5, i.e. standard pinions.

According to the invention, the torques of the special pinions (differential side gear 6 and a differential pinion 4) have geometric characteristics of base circle radius and center distances such as the efficiency of this gearing is deliberately small so as to assure the torque transfer function. By way of example, a center distance to base circle radius ratio greater than 4 assures, taking into account a friction coefficient of 0.15, an efficiency lower than 0.55. The special pinions, in addition, having by nature a rather high helix angle (helix on at least a half-turn for a pinion with two teeth), will generate, under torque, an axial thrust that thus creates a loss of additional efficiency on friction stops 8.

It should also be noted that the continuity of rotation of differential pinion assemblies 2 is assured by the meshings of the output having standard pinions 3.

Therefore, it is not necessary, and this is one of the characteristics of the invention, since there are several differential pinion assemblies 2, that complete drive continuity be assured at the level of each pair of special pinions in order to have, nevertheless, complete drive continuity to the differential side gear output. Therefore, it will be possible, as desired, to reduce the helix angle so as to decrease the axial thrust or reduce the thickness of the special pinions to decrease the axial bulk. This makes it possible to adjust the friction in a given structure.

The following points which are characteristics of the invention will result from the description.

As a first characteristic, the differential that is the object of this invention is composed of a housing 1 carrying differential assemblies 2 with axes parallel to the axis of housing 1 and two outputs at differential side gear 5 and 6.

As a second characteristic, one of the outputs is composed of standard pinion, i.e., differential pinions 3 and differential side gear 5. The other output is composed of special pinions, i.e., differential pinions 4 and differential side gear 6, differential pinions 3 and 4 of each pinion assembly being connected in rotation on each of their shafts by welding.

As a third characteristic, the special pinions, i.e., differential pinions 4 and their differential side gear 6, are identical parts, in the sense that they have the same number of teeth and the same toothing.

As a fourth characteristic, the theoretical division of the torque without friction is given solely by the ratios of teeth of the set of standard pinions, i.e., differential pinions 3 and differential side gear 5.

As a fifth characteristic, the torque transfer function is assured by a judicious selection of the ratio between the center distance and the radius of the base circle of the special differential side gear 6 and differential pinion 4 gearing. This ratio preferably being greater than 4.

As a sixth characteristic, stops 8 make it possible to obtain friction additional to that generated by the helix angle of the special pinions, which is a large angle by the very nature of these pinions.

As a seventh characteristic, total meshing continuity at the level of each special pinion or differential pinion 4 is not necessary in order to have total continuity at the output, which makes it possible to modulate the additional forces or to reduce the bulk.

As an eighth characteristic, all the pinions can be machined and inspected on traditional machines to cut the cylindrical gearings with an involute of a circle.

Obviously, numerous modifications and variations of the present invention are possible in light of the above teachings. It is therefore to be understood that, within the scope of the appended claims, the invention may be practiced otherwise than as specifically described herein.

We claim:

1. A differential device comprising:
   an input comprising a housing having an axis;
   a plurality of differential pinion assemblies mounted on said housing, each of said differential pinion assemblies comprising standard and helical pinions mounted to said housing for rotation about an axis parallel to said housing axis and fixed in rotation relative to one another;
   one output comprising a differential side gear meshing with said standard pinions and rotating in a direction opposite thereto;
   another output comprising a helical side gear meshing with said helical pinions, said helical side gear and helical pinions comprising means for rotating in the same direction, whereby said first and second outputs rotate in directions opposite to one another; and
   frictional rotational retardation means positioned axially of said helical pinions for retarding rotation of said helical pinions as a function of a helix angle thereof.

2. The differential device according to claim 1 wherein said helical pinions and said helical side gear have the same number of teeth and an identical toothing.

3. The differential device according to claim 1 wherein a ratio of the teeth of said standard pinions and differential side gear is set such that torque may be distributed entirely therethrough.

4. The differential device according to claim 1 wherein a center distance and radii of base circles of said helical pinions and said helical side gear are set according to a desired torque transfer function.

5. The differential device according to claim 1 wherein said standard pinion and helical pinion of each said differential pinion assembly are welded to one another.

6. The differential device according to claim 4 wherein a ratio of said center distance and radii is greater than 4.

* * * * *